(12) United States Patent
Sayeed et al.

(10) Patent No.: US 7,218,906 B2
(45) Date of Patent: May 15, 2007

(54) LAYERED SPACE TIME PROCESSING IN A MULTIPLE ANTENNA SYSTEM

(75) Inventors: Akbar Muhammad Sayeed, Madison, WI (US); Ke Liu, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 537 days.

(21) Appl. No.: 09/971,071

(22) Filed: Oct. 4, 2001

(65) Prior Publication Data

US 2003/0068994 A1  Apr. 10, 2003

(51) Int. Cl.
*H04B 1/10* (2006.01)
*H04B 17/00* (2006.01)
*H04B 7/02* (2006.01)
*H04B 1/02* (2006.01)

(52) U.S. Cl. .................. 455/295; 455/67.13; 455/101; 375/267

(58) Field of Classification Search ........ 375/346–349, 375/260, 267; 455/423–425, 67.11, 67.13, 455/67.14, 67.16, 115.1–115.4, 226.1, 226.4, 455/101–103
See application file for complete search history.

(56) References Cited

U.S. PATENT DOCUMENTS

| | | | |
|---|---|---|---|
| 5,018,065 A * | 5/1991 | McWhirter et al. | 712/19 |
| 5,151,919 A * | 9/1992 | Dent | 370/209 |
| 5,294,933 A * | 3/1994 | Lee et al. | 342/159 |
| 5,323,418 A * | 6/1994 | Ayerst et al. | 375/148 |
| 6,317,466 B1 * | 11/2001 | Foschini et al. | 375/267 |
| 6,782,036 B1 * | 8/2004 | Dowling et al. | 375/130 |

\* cited by examiner

*Primary Examiner*—Duc M. Nguyen
*Assistant Examiner*—Michael Thier
(74) *Attorney, Agent, or Firm*—Foley & Lardner, LLP (57) ABSTRACT

A system and method for performing extended space-time processing. An improved symbol decision is generated of a desired sub-channel of the signal vector by first generating a baseline decision for the sub-channel. A contribution of a strongest sub-channel is subtracted from the signal vector to generate a modified signal vector. The modified signal vector is multiplied by a unitary matrix generated from a QR decomposition of another channel matrix. Channel interference of the remaining sub-channels of the modified signal vector is cancelled from a remaining sub-channel.

33 Claims, 6 Drawing Sheets

LAYERED SPACE TIME PROCESSING IN A MULTIPLE ANTENNA SYSTEM

This invention was made with United States government support awarded by the following agencies: NSF CCR-9875805, NSF ECS-9979408, and DARPA F30602-00-2-0555. The United States has certain rights in this invention.

BACKGROUND OF THE INVENTION

1. Field of Invention

The present invention is directed to wireless communication systems. In particular, the present invention is directed to wireless communication systems utilizing multiple antenna arrays.

2. Description of Related Art

Presently, multiple antenna arrays are used for transmitting data in wireless communication systems. For example, multiple antennas are used at both the transmitter and at the receiver for transmitting data. These multiple antenna arrays can increase wireless channel capacity linearly by the number of transmit antennas, providing the number of receive antennas is greater or equal to the number of transmit antennas. Unfortunately, the relatively high dimensional nature of multiple antenna array systems has high computational complexity in practical systems.

One example of a wireless communication system for generating a high data rate using a multiple antenna array is disclosed in U.S. Pat. No. 6,097,771, issued Aug. 1, 2000. This system is otherwise known as a Bell Laboratories Layered Space-Time (BLAST) system. The BLAST system utilizes multiple transmit antennas and multiple receive antennas along with signal processing for interference cancellation.

An example of such systems utilizes, for example, four transmitter antennas and four receiver antennas. This system can create four independent sub-channels within a single bandwidth by coding the sub-channels individually as opposed to coding them jointly. Thus, the system increases capacity within a bandwidth by four-fold by exploiting the idea of diversity such that each channel corresponds with transmitting over many Raleigh fading channels. Accordingly, even if one channel is bad, it is combined with the other good channels to reduce the fluctuation of signal strength. This is because each channel then has enough diversity so that each one ends up appearing as a traditional additive white Gaussian noise channel from clear signal processing. However, the creation of the sub-channels requires signal processing to remove interference between the sub-channels.

In operation, the BLAST system performs signal processing to create four parallel sub-channels in a sequential procedure. This sequential method involves removing channel interference by sequentially subtracting the signal of one sub-channel from the other sub-channels. Unfortunately, the system ends up starting with the sub-channel with the lowest diversity. This is a problem because the sub-channel with the lowest diversity order is, in essence, the worst channel. The higher diversity sub-channels are created by subtracting decisions from the worst sub-channel to create more reliable sub-channels. Therefore, this method is backward in the sense that it starts with the least reliable decision to create successive, more reliable sub-channels. Thus, problems with the worst sub-channel can create problems with the more reliable sub-channels. Also, this method is excessively complex and thus requires a significant amount of processing power. Furthermore, this method has the problem in that it creates unequal levels of diversity. For example, in a four sub-channel system, one sub-channel has a first order diversity, another sub-channel has a second order diversity, another sub-channel has a third order diversity, and the last sub-channel has a fourth order diversity. This creates more unreliability because the lower order diversity sub-channels are more unreliable.

SUMMARY OF THE INVENTION

The present invention provides a more reliable wireless communication system utilizing a multiple antenna array. The system is more reliable at least because it begins with a higher order diversity sub-channel. Additionally, the present invention provides a less complex method of determining initial decisions on sub-channels. Also, the present invention is very efficient. Furthermore, the present invention provides dramatic performance improvements over traditional systems.

These features, along with other features described below, are provided for by a system and method for performing space-time processing method for removing interference for a multiple antenna array system. A decision of a desired sub-channel of the signal vector is generated by nulling out the interference of a first set of sub-channels by multiplying the received signal vector by a unitary matrix generated from a QR decomposition of a channel matrix. An improved symbol decision is generated by successively canceling channel interference due to a second set of sub-channels. The symbol represents transmitted bits, transmitted coded bits, or other useful transmitted information. For example, the symbol represents the decoded or coded bits of a digital transmission.

According to another embodiment, the system and method performs an extended space-time processing. An improved symbol decision of a desired sub-channel of the signal vector is generated by generating a baseline decision for the sub-channel. This baseline decision can be generated by the baseline method, by the BLAST system, or by any other method useful for generating a decision for a sub-channel. Next, a contribution of a strongest sub-channel is subtracted from the signal vector to generate a modified signal vector. The modified signal vector is multiplied by a unitary matrix generated from a QR decomposition of another channel matrix. Channel interference of the remaining sub-channels of the modified signal vector is successively cancelled from a remaining sub-channel.

BRIEF DESCRIPTION OF THE DRAWINGS

The preferred embodiments of the present invention will be described with reference to the following figures, wherein like numerals designate like elements, and wherein.

DETAILED DESCRIPTION OF PREFERRED EMBODIMENTS

Figure 1:
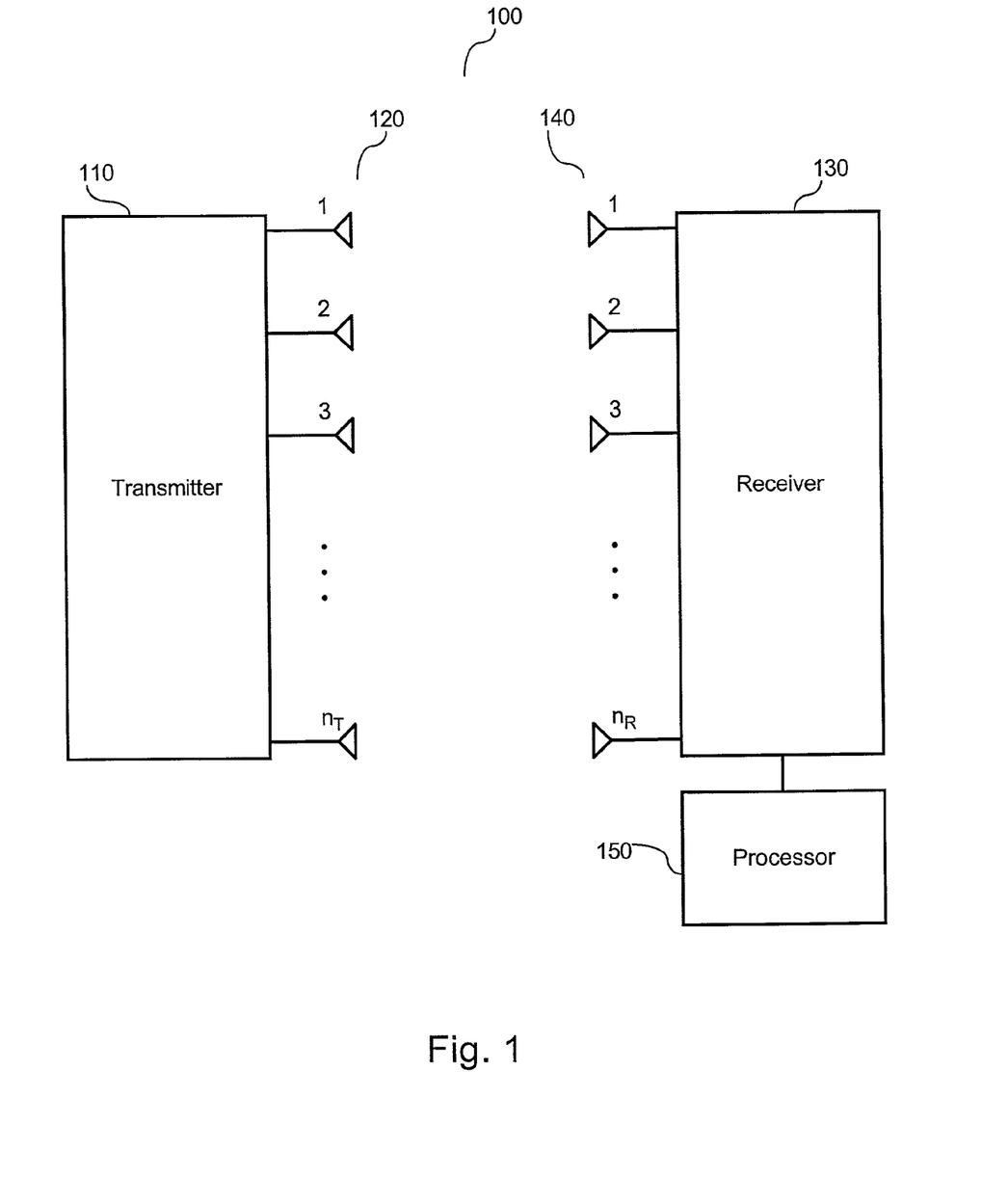
FIG. 1 is an exemplary block diagram of a wireless system according to one embodiment.

FIG. 1 is an exemplary block diagram of a wireless system 100 according to a first embodiment. The wireless system 100 includes a transmitter 110 including an array of transmit antennas 120, a receiver 130 including an array of receive antennas 140, and a controller or processor 150. Preferably, the number of transmit antennas $n_T$ is equal to the number of receive antennas $n_R$. In operation, the transmitter 110 transmits a signal vector via the array of transmit antennas 120. The signal vector is received by the receiver 130 via the array of receive antennas 140. For example, the transmitter 110 transmits different bit streams on different sub-channels on different transmit antennas 120. The number of sub-channels preferably corresponds to the number of receive antennas $n_R$.

The signal vector received by the receive antennas 140 can be represented as:

$$r_t = A_s H_t s_t + n_t$$

where $r_t$ represents the received signal vector, $A_s$ represents a power normalization constant, $H_t$ represents the channel matrix, $s_t$ represents the transmitted signal vector, $n_t$ represents a noise vector, and t represents a discrete time instant. For simplification, the time index may be ignored in the following descriptions.

The received signal vector values can further be represented as:

$$r = \begin{pmatrix} r_1 \\ r_2 \\ \vdots \\ r_{n_R} \end{pmatrix}$$

$$s = \begin{pmatrix} s_1 \\ s_2 \\ \vdots \\ s_{n_T} \end{pmatrix}$$

$$H = \begin{pmatrix} h_{1,1} & \cdots & h_{1,n_T} \\ & \vdots & \\ h_{n_R,1} & \cdots & h_{n_R,n_T} \end{pmatrix}$$

$$n = \begin{pmatrix} n_1 \\ n_2 \\ \vdots \\ n_R \end{pmatrix}$$

The noise vector can be assumed to be an $n_r$ dimensional complex Gaussian vector with zero mean and covariance matrix I. Noise is assumed to be independent at different time instants. A k-dimensional complex (real) Gaussian random vector with mean m and covariance matrix R can be denoted by:

$$CN^k(m, R)(N^k(m, R)).$$

Each entry $h_{i,j}$ in the channel matrix H represents the path gain between the i-th receive antenna and the j-th transmit antenna. In a rich scattering environment, all entries are modeled as independent identically distributed (iid) $CN^1(0, 1)$ random variables. A chi-squared variable with K degrees of freedom denoted by $\chi_k^2$ is defined as:

$$\sum_{i=1}^{k} a_i^2$$

where $a_i$ represents independent identically distributed $N^1(0, ½)$ random variables.

For further analysis, E[•] denotes expectation, t means transpose for real matrices where the transpose is Hermitian for complex matrices, and ⊥ stands for "orthogonal to."

Generally, transmitted power is equally distributed between transmit antennas and the same signal constellation is used at all transmit antennas. The power normalization constant $A_s$ normalizes the signal constellation to have unit average power. Since the noise has unit power in the channel model, the signal to noise ratio (SNR) is represented as:

$$SNR = n_T A_s^2$$

The transmitted power is generally fixed independent of the number of transmit antennas.

Generally, the channel matrix H changes over time due to channel fading. A quasi-static approximation of the fading channel is adopted. For example, the channel remains unchanged during a coherent channel period which lasts $T_{coh}$ time instants. However, the channel changes independently from one coherence period to another. Also, H is generally known to the receiver 130, but not to the transmitter 110.

The ergodic capacity of the multiple antenna system 100 can be represented as:

$$C = E[C(H)] = E[\log \det(I + (SNR/n_T)HH^t)]$$

In particular, $C(H) = \log(1 + SNR\chi_{2k}^2)$ for a k-order diversity (1,k) system.

According to one embodiment, the processor performs baseline space-time processing method or baseline method for removing interference for $n_T = n_R = n$.

In this method, the processor generates a decision of a desired sub-channel of the signal vector by nulling out the interference of a first set of sub-channels by multiplying the received signal vector by a unitary matrix generated from a QR decomposition of a channel matrix and the processor further generates the improved symbol decision by successively canceling channel interference due to a second set of sub-channels. The symbol represents transmitted bits, transmitted coded bits, or other useful transmitted information. For example, the symbol represents the decoded or coded bits of a digital transmission.

A more detailed description of the baseline method is described below.

For initial definitions, a tight lower bound of C(H) for a n transmitter and n receiver, (n,n), system is found according to:

$$C(H) > \sum_{k=1}^{n} \log(1 + (SNR/n)\chi_{2k}^2)$$

While this baseline space-time processing analysis is calculated for a (n,n) system, it can also apply to a $n_T$ transmitter and $n_R$ receiver, $(n_T, n_R)$, system. The channel matrix H can be written as $(h_1, h_2, \ldots, h_n)$ where $h_j$ with $1 \leq j \leq n$ denotes the j-th column of H. Then, let $H_j$ denote the linear space spanned by $h_1, h_2, \ldots, h_j$. Accordingly, $H_j = \text{Span}(h_1, h_2, \ldots, h_j)$.

Figure 2:
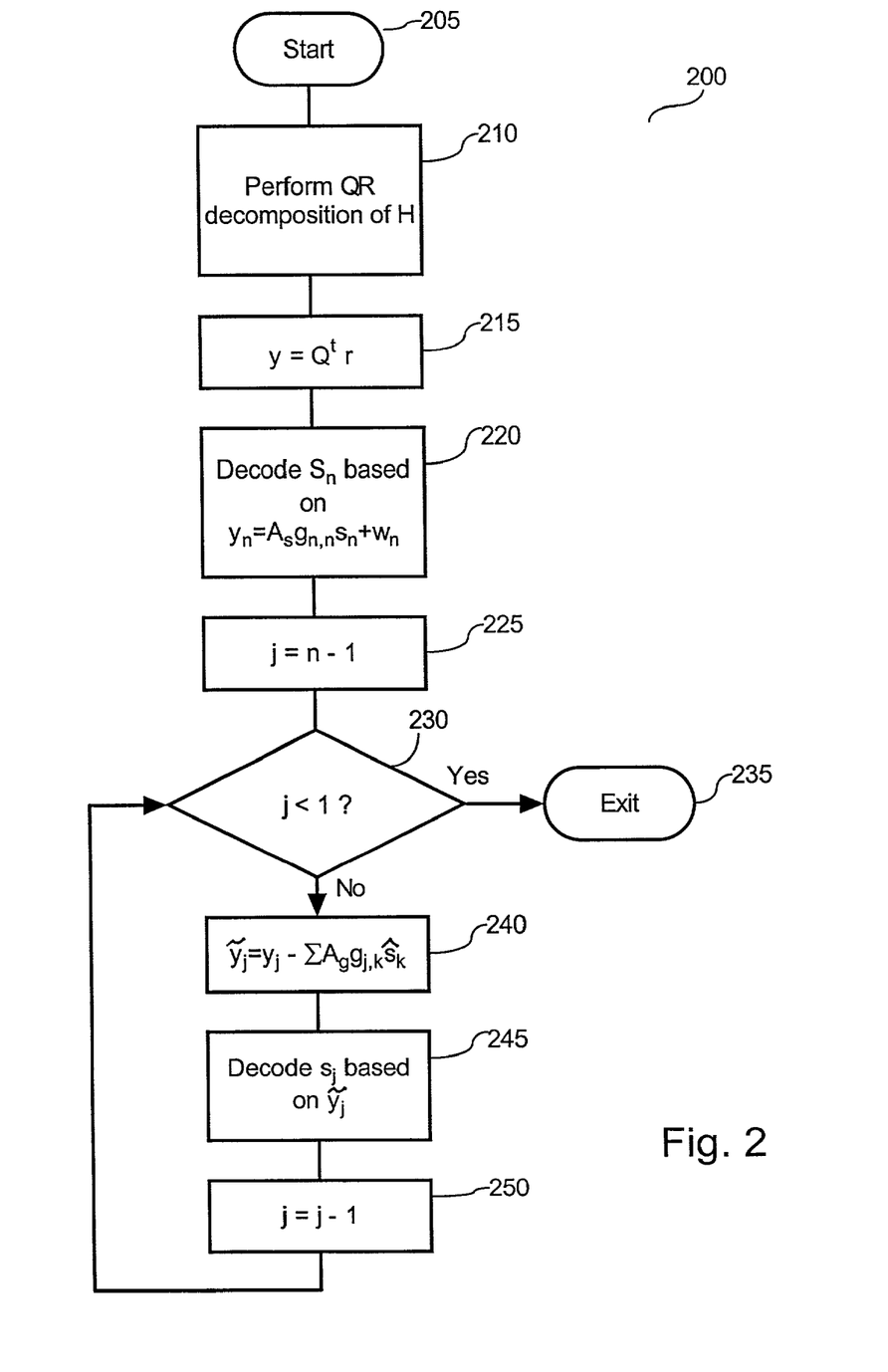
FIG. 2 is an exemplary flowchart outlining the operation of the processor according to a baseline method.

FIG. 2 is an exemplary flowchart 200 outlining the more detailed operation of the processor 150 according to the baseline method. In step 205, the operation begins. In step 210, the processor 150 performs a QR decomposition of the channel matrix H. In particular, H=QG, where Q is a unitary matrix and G is an upper triangular matrix (the variable G is used instead of the classic R because R is already used as a variable in the process). Accordingly, $$H = QG = (q_1 \ldots q_{n-1} q_n) \begin{pmatrix} g_{1,1} & \cdots & \cdots & \cdots \\ 0 & \ddots & \vdots & \vdots \\ \vdots & 0 & g_{n-1,n-1} & g_{n-1,n} \\ 0 & \cdots & 0 & g_{n,n} \end{pmatrix}$$

Where Q is a unitary matrix with the following properties:

$H_j = \text{Span}(q_1, \ldots, q_j), 1 \leq j \leq n$ $H_{j-1} \perp q_j, 1 \leq j \leq n.$ The entries in the upper triangular matrix G have particular distributions summarized as:

$|g_{j,j}|^2 \sim \chi^2_{2(n-j+1)}, 1 \leq j \leq n$ $|g_{i,j}|^2 \sim \chi^2_2, 1 \leq i < j \leq n$ The signal vector received by the receive antennas 140 can be rewritten as:

$$r = A_s \sum_{j=1}^{n} h_j s_j + n$$

Symbols from different antennas interfere with each other. Accordingly, in step 215, the processor 150 performs interference nulling in one step by multiplying r by $Q^t$. This is a significant simplification over present systems that perform extensive processing to null out interfering sub-channels. In particular, present systems perform interference nulling by decoding $s_n$ by projecting r onto $H_{n-1}^\perp$, thus avoiding interference from symbols $s_1, \ldots, s_n$. The signal due to $s_n$ is then subtracted from r and $s_{n-1}$ is decoded by nulling out interference from $s_1$ to $s_{n-2}$. This processing proceeds until the signal is decoded.

According to the present invention, the processor 150 determines the symbol $y = Q^t r$, where r is the received signal and $Q^t$ is the Hermitian transpose of Q. In other words, $y = Gs + w$, where s is the transmitted signal and w is the noise. Therefore, the interference nulling pattern is created directly by the unitary transformation. In step 220, the processor 150 decodes the symbol $y_n$ of the $n^{th}$ transmit antenna according to:

$y_n = A_s g_{n,n} s_n + w_n$

Again, where $A_s$ is the power normalization constant, $g_{n,n}$ is the upper triangular matrix, $s_n$ is the transmitted signal, and $w_n$ is the noise. The corresponding decision is denoted $\hat{s}_n$.

In the following steps, the processor 150 successively decodes the symbols from n−1 to the first transmit antenna. Accordingly, in step 225, the processor sets j=n−1. In step 230, the processor determines if j<1. If true, then the processor exits the operation in step 235. If false, the processor proceeds to step 240 where it subtracts interference from the next symbol according to:

$$\tilde{y}_j = y_j - \sum_{k=j+1}^{n} A_s g_{j,k} \hat{s}_k$$

which can be rewritten as:

$$= A_s g_{j,j} s_j + \sum_{k=j+1}^{n} A_s g_{j,k} (s_k - \hat{s}_k) + w_j$$

In step 245, the processor 150 decodes the symbol decision $\hat{s}_j$ based on $\tilde{y}_j$. In step 250, the processor decrements j by one and returns to step 230.

This process effectively creates n non-interfering one-dimensional sub-channels where the $j^{th}$ sub-channel is described as:

$\tilde{y}_{j,t} = A_s g_{j,j,t} s_{j,t} + w_{j,t}, 1 \leq j \leq n$ where $|g_{j,j,t}|^2 \sim \chi^2_{2(n-j+1)}$ In particular, the $j^{th}$ sub-channel corresponds to n−j+1 order diversity.

Figure 3:
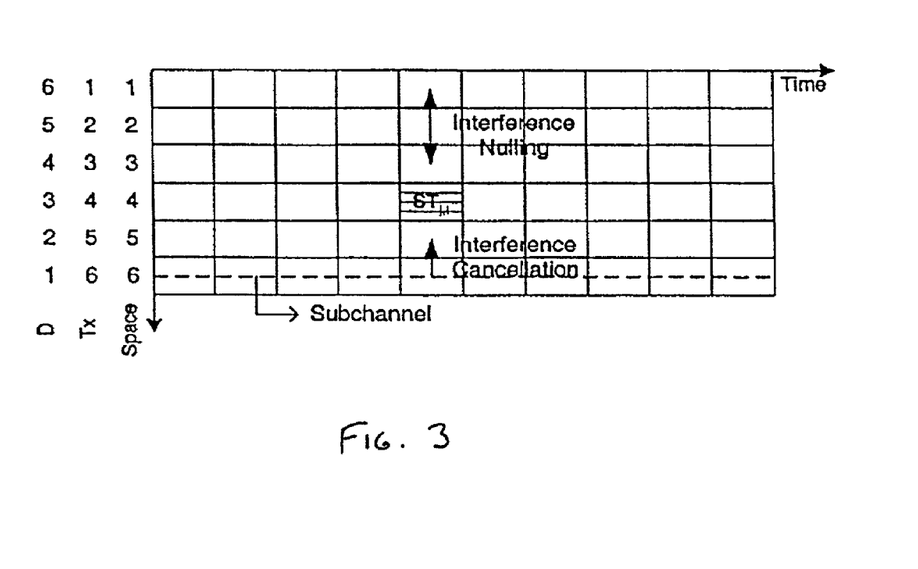
FIG. 3 is an exemplary illustration of a space-time processing schematic for a six transmitter and six receiver system according to one baseline embodiment.

FIG. 3 is an exemplary illustration of a space-time processing schematic for a six transmitter and six receiver (6, 6) system according to one baseline embodiment. Tx represents the transmitter index and D represents the diversity order associated with the corresponding sub-channel. The horizontal direction indicates time instants and the vertical direction indicates spatial sub-channels created by the baseline method. As shown, each sub-channel is associated with a particular transmit antenna. The space-time processing is visualized by a two dimensional stack of rectangles where $ST_{j,t}$ denotes the rectangle corresponding to the $j^{th}$ sub-channel at the $t^{th}$ time instant. This symbolizes a space-time processing unit aimed at retrieving information from the $j^{th}$ sub-channel at the $t^{th}$ time instant by subtracting interference from other transmitters and forming decisions $\hat{s}_j$ according to the particular coding scheme used. Similarly, a row of rectangles represent the processing with respect to the corresponding spatial sub-channel at different time instants and a column of rectangles represent the processing at the corresponding time instant for all spatial sub-channels. Accordingly, the system equation for $ST_{j,t}$ can be written as $$y_{j,t} = A_s g_{j,j,t} s_{j,t} + \sum_{k=j+1}^{n} A_s g_{j,k,t} s_{k,t} + w_{j,t}$$

which shows that interference from the transmit antennas 120 corresponding to rectangles above the unit have been nulled out and that interference from transmit antennas 120 corresponding to rectangles below the unit must be cancelled by using decision feedbacks. Therefore, the baseline method provides a framework to construct various layered space-time structures.

Figure 4:
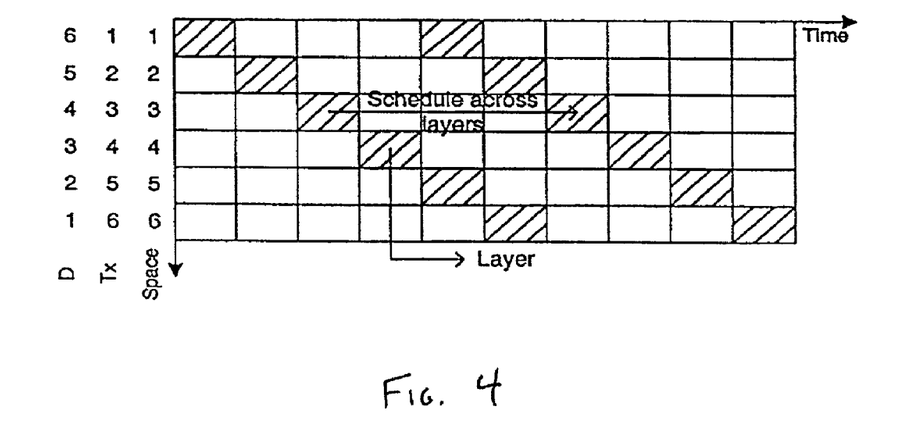
FIG. 4 is an exemplary illustration of a schematic for processing similar to BLAST for a (6, 6) system according to one embodiment.

FIG. 4 is an exemplary illustration of a schematic for processing similar to BLAST for a (6, 6) system. According to this processing, a layer is composed of six units in the diagonal direction where the arrow indicates the processing from left to right. Accordingly, each of the six diagonal unit in the schematic comprises a layer upon which codes can be applied. Different layers are processed from left to right for interference cancellation. The baseline method improves on BLAST at least in its simplicity and efficiency of operation.

For performance analysis, a D order diversity channel is described as y=hx+n where $|h|^2 \sim \chi_{2D}^2, n \sim CN^1(0,\sigma^2)$ and $A_s$ normalizes the signal constellation to have unit power. The average SNR per diversity branch is denoted $$p = \frac{A_s^2}{\sigma^2}.$$

The probability of bit error, $P_e$, of the binary phase shift keying (BPSK) is then determined according to:

$$P_e = \left[\frac{1}{2}(1-\mu)\right]^D \sum_{d=0}^{D-1} \binom{D-1-d}{d} \left[\frac{1}{2}(1+\mu)\right]^d$$

where $$\mu = \sqrt{\frac{\rho}{1+\rho}}$$

The term $$\sum_{k=j+1}^{n} A_s g_{j,k}(s_k - \hat{s}_k) + w_j$$

is the interference term due to imperfect decision feedbacks. In order to quantify the effect of interference, it is approximated as a Gaussian random variable, $\tilde{w}_j$. $P_e$ is defined for $s_k$ to be $p_k$. That is, $Pr(s_k \neq \hat{s}_k) = p_k$. Given an equal probability of 1 and −1 under BPSK modulation, it is easy to verify that $$E[s_k - \hat{s}_k] = 0$$

and $$E[|s_k - \hat{s}_k|^2] = 4p_k.$$

Therefore, the mean and variance of $\tilde{w}_j$ are given by:

$$E[\tilde{w}_j] = 0$$

$$E[|\tilde{w}_j|^2] = 4A_s^2 \sum_{k=j}^{n_T} p_k$$

by using $g_{j,k} \sim \chi_2^2$ and it is independent of $s_k - \hat{s}_k$. Then, $P_e$ is calculated for all sub-channels under a Gaussian approximation of interference. $P_e$ is calculated by first calculating $p_{n_T}$ of the $n_T^{th}$ sub-channel by using the equation for $P_e$ with a diversity order of $D = n_R - n_T + 1$ and $\rho = |A_s|^2$. Second, $p_k$ is calculated successively from $n_T - 1$ to 1. For a given k, the interference power $\tilde{\rho}^2$ is calculated. Then, $p_k$ is calculated by utilizing the equation for $P_e$ with $D = n_R - k + 1$ and $$\tilde{\rho} = \frac{|A_s|^2}{1+\tilde{\sigma}^2}.$$

Third, the overall probability of bit error, $P_e$, is obtained by averaging across all the sub-channels. Accordingly, $$P_b(SNR) = \frac{\sum_{k=1}^{n_T} p_k}{n_T}$$

Figure 5:
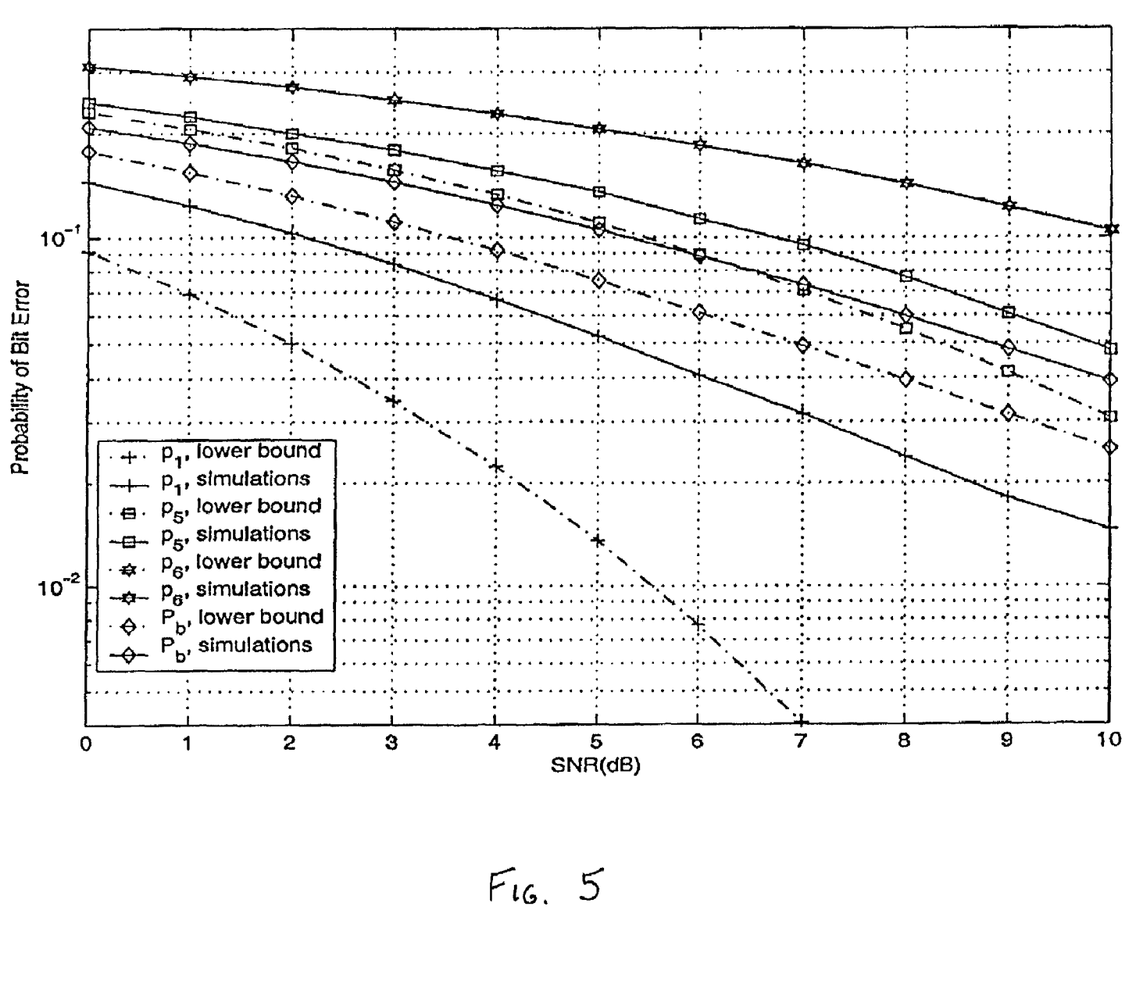
FIG. 5 is an exemplary illustration of performance analysis of the baseline method according to one embodiment.

FIG. 5 is an exemplary illustration of performance analysis of the baseline method. This performance analysis illustrates the lower bound for the probability of bit error. This is based on a simulation of baseline processing for a 6 transmitter and 6 receiver (6,6) system with $T_{coh} = 10,000$ time instants. BPSK was used at the transmitter. The estimated performance was averaged over 10,000 channel coherence periods, or a total of $10^8$ time instants. The nominal $P_e$ performance, assuming perfect interference cancellation was computed using the above equations and served as a lower bound on the actual $P_e$ performance. As described in the Background, since feedback from sub-channels with low diversity are used to create sub-channels with high diversity, imperfect decision feedbacks can compromise the performance of the sub-channels with a high diversity order. In FIG. 5, the nominal and the actual $P_e$ is plotted for several sub-channels in the (6,6) system. In comparing nominal performance with actual simulation data, it is shown that imperfect decision feedbacks can affect sub-channels with large diversity order. Also, the system performance can be limited by the worst sub-channel. Thus, the worst sub-channel in a layered space-time structure can be a bottleneck in limiting system performance.

According to another embodiment, the processor 150 performs an extended space-time processing method or extended method.

As shown above, the strongest sub-channel with the largest diversity order is formed by successive decision feedbacks from the rest of the sub-channels. Accordingly, the strongest sub-channel has better performance than those with less diversity. Unfortunately, this fact is not utilized in a BLAST-type space-time processing structure. The present inventors have recognized that a direct way to improve system performance is to subtract the strongest sub-channel from the total received signal using the strongest sub-channel's decision. This is defined as a "loopback" process because it forms a feedback flow in a reverse order. Loopback operation can effectively remove the contribution of the transmit antenna corresponding to the strongest sub-channel.

A (6,6) system can be used to further explain the loopback procedure. First, decisions are generated for the sub-channels using the baseline operation, BLAST, or the like. The resulting diversity order for each respective sub-channel is 6, 5, 4, 3, 2, 1. From the generated decisions, a signal due to, for example, the $1^{st}$ transmit antenna is effectively reconstructed. This signal is subtracted from the received signal.

The received signal is now effectively a 5 transmitter and 6 receiver (5,6) system. If the baseline operation is performed, the diversity order of all of the sub-channels from 2 to 6 is improved by 1 diversity order. These improved sub-channels produce improved decisions which thus assist in the decoding of the $1^{st}$ sub-channel. Thus, the first iteration of a loopback operation results in a diversity order for each respective sub-channel being 6, 6, 5, 4, 3, 2. This accordingly improves the diversity order of the second sub-channel to full diversity. The loopback operation can be continued by subtracting successively improving sub-channels. For example, both the $1^{st}$ and $2^{nd}$ sub-channels are next subtracted, thus effectively forming a (4,6) system.

The depth of the loopback operation is defined as $I_{loopback}$. Therefore, sub-channels 1 to $I_{loopback}$ are used successively in the loopback cancellation. Since processing structure evolves after each loopback operation, the final structure has the property that the first $I_{loopback}+1$ sub-channels have full diversity order, while the rest have 5 down to $1+I_{loopback}$. For example, the baseline operation corresponds to $I_{loopback}=0$. Also, the loopback processing can iterate at the final stage $I_{final}$ times without looping back to the next sub-channel.

In the extended method, the processor 150 generates an improved symbol decision of a desired sub-channel of the signal vector by first generating a baseline decision for the sub-channel. This baseline decision can be generated by the baseline method, by the BLAST system, or by any other method useful for generating a decision for a sub-channel. Next, the processor 150 subtracts a contribution of a strongest sub-channel from the signal vector to generate a modified signal vector. Then, the processor 150 multiplies the modified signal vector by a unitary matrix generated from a QR decomposition of another channel matrix. Finally, the processor 150 successively cancels channel interference of the remaining sub-channels of the modified signal vector from a remaining sub-channel.

Figure 6:
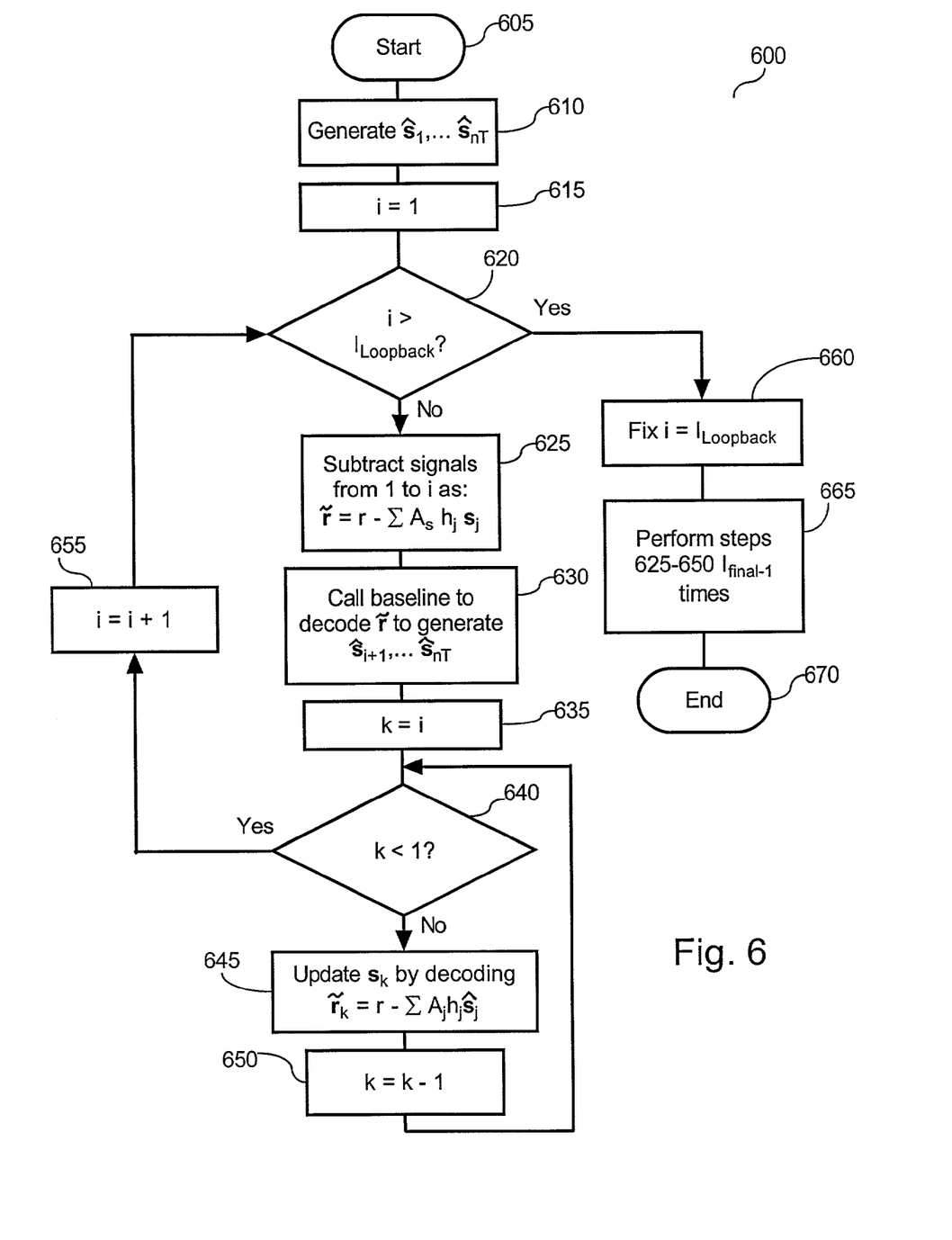
FIG. 6 is an exemplary flowchart outlining the operation of the processor according to the extended method according to one embodiment.

A more detailed description of the extended method is described below:

FIG. 6 is an exemplary flowchart 600 outlining the operation of the processor 150 according to the extended method. In step 605, the operation begins. In step 610, the processor 150 generates the initial symbol decisions ($\hat{s}_1$, $\hat{s}_2$, ... $\hat{s}_{n_T}$). The processor 150 can generate these symbol decisions by utilizing the baseline method, a method such as BLAST, or any like method. For example, the processor 150 decodes each sub-channel utilizing the baseline method for ($n_T$, $n_R$). The decision at the $k^{th}$ sub-channel is denoted $\hat{s}_k$. In step 615, the processor 150 sets i=1 to begin a loop for i=1 to $I_{loopback}$ to use sub-channels 1 to $I_{loopback}$ successively in loopback cancellation. In step 620, the processor 150 determines if i>$I_{loopback}$. If so, the processor advances to step 660. If i≤$I_{loopback}$, the processor 150 advances to step 625.

In step 625, the processor subtracts the signals from the sub-channels 1 to i to generate an improved received signal $\tilde{r}$ according to:

$$\tilde{r} = r - \sum_{j=1}^{i} A_s h_j \hat{s}_j$$

$$= A_s H_i s_i + \sum_{j=1}^{i} A_s h_j (s_j - \hat{s}_j) + n$$

$$= A_s H_i s_i + \tilde{n}$$

In step 630, the processor 150 decodes the received signal $\tilde{r}$ to generate symbol decisions $\hat{s}_i = (\hat{s}_{i+1}, \ldots, \hat{s}_{n_T})^t$, where t stands for the transpose. The processor 150 can decode the received signal $\tilde{r}$ by utilizing the baseline method, a method such as BLAST, or any like method.

In step 635, the processor 150 sets k=1 to begin a loop for k=i to 1 to cancel interference from the other sub-channels. In step 640, the processor determines whether to exit the loop based on k<1. If k≧1, the processor advances to step 645. In step 645, the processor cancels the interference from the other sub-channels according to:

$$\tilde{r}_k = r - \sum_{j \neq k} A_s h_j \hat{s}_j$$

and then updates symbol decision $\hat{s}_k$ by decoding $\tilde{r}_k$. In step 650, the processor 150 decrements k and returns to step 640.

If k≦1 in step 640, the processor 150 increments i in step 665 and returns to step 620. If i>$I_{loopback}$ in step 620, the processor 150 advances to step 660 where it fixes i=$I_{loopback}$. In step 665, the processor 150 performs the functions of steps 625–650 for $I_{final}-1$ iterations. In step 670, the operation ends.

Figure 7:
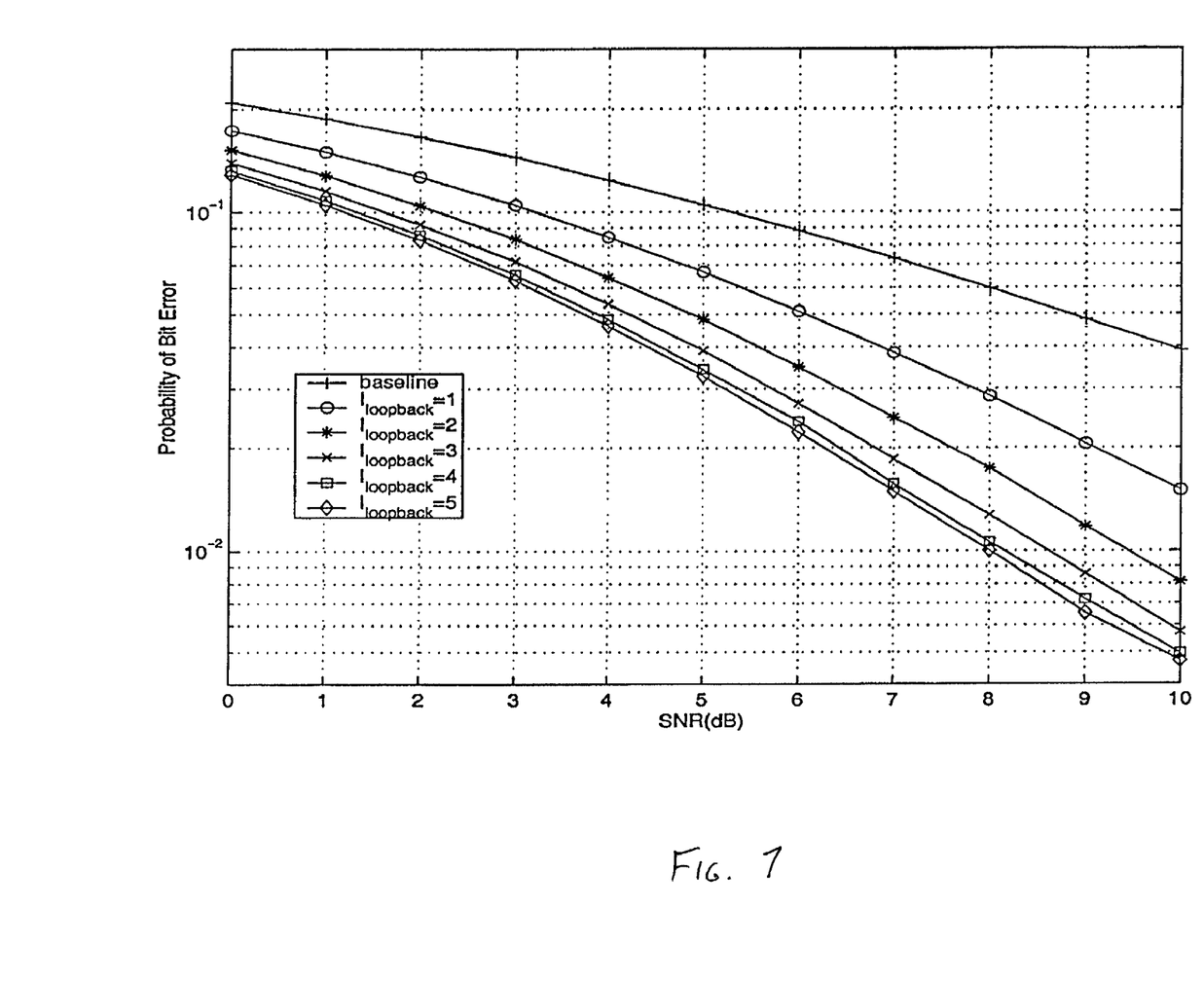
FIG. 7 is an exemplary illustration of performance analysis of the extended method according to one embodiment.

FIG. 7 is an exemplary illustration of performance analysis of the extended method. As discussed above, the performance can be studied analytically by approximating the residual interference after the decision feedback as Gaussian random variables. $P_e$ in each step of the extended algorithm is obtained by calculating the variance of residual interference. The performance algorithm is given by setting $p=(p_1, \ldots, p_{n_T})^t$ to be a vector of $P_e$'s of all sub channels at each step of the extended algorithm with a specific $I_{loopback}$ and $I_{final}$. Then set $p=(p_1, \ldots, p_{n_T})^t$. Given a SNR, $$|A_s|^2 = \frac{SNR}{n_T}.$$

Then, p is calculated in accordance with the baseline structure. Next, a loop is set from i=1 to $I_{loopback}$. By Gaussian approximation of residual interference, the noise $\tilde{n}$ is distributed as $CN^{n_R}(0, \tilde{\sigma}^2)$ with $$\tilde{\sigma}^2 = 1 + 4A_s^2 \sum_{j=1}^{i} p_j$$

Then, $p_i$ is generated as described above with respect to the baseline operation. Next, from k=i to 1, $p_k$ is updated using the above equations with a diversity order of $D=n_R$ and $$\rho = \frac{A_s^2}{1 + 4A_s^2 \sum_{j \neq k} p_j}.$$

FIG. 7 illustrates the performance improvement with loopback cancellation in the extended method for a (6,6) system. As before, bits are sent using BPSK at each transmit antenna. $I_{final}$ is fixed to be 1 while varying the loopback depth $I_{loopback}$ from 1 to 5. The performance of a baseline or BLAST-type algorithm is included for comparison. As illustrated, large performance gain is achieved by using loopback cancellation. For example, the system with full loopback at 4 dB already achieves $P_e$ of the BLAST system at 9 dB, thus resulting in a 5 dB savings. Performance gain increases as SNR increases, which projects more power savings at higher SNR's. Also, a few loopback cancellations can be sufficient. As illustrated in FIG. 7, large performance improvements are achieved with only 1 or 2 levels of loopback.

While this invention has been described with specific embodiments thereof, it is evident that many alternatives, modifications, and variations will be apparent to those skilled in the art. For example, various elements and various steps of different aspects and embodiments may be combined with various elements and various steps of other aspects and embodiments. Accordingly, the preferred embodiments of the invention as set forth herein are intended to be illustrative, not limiting. Various changes may be made without departing from the spirit and scope of the invention.

What is claimed is:

1. A wireless system comprising:
    a plurality of transmit antennas, the plurality of transmit antennas configured to transmit a signal vector;
    a receiver including a plurality of antennas, the receiver configured to receive the signal vector; and
    a processor operably coupled to the receiver to receive the signal vector, the processor configured to
        generate a plurality of symbol decisions $\hat{s}_n$; $1 \leq n \leq N$ from the received signal vector using a first method, where N is a number of sub-channels;
        subtract a first signal from the received signal vector to form a first modified signal vector, the first signal defined based on a symbol decision generated for a strongest sub-channel of the sub-channels;
        generate a first improved symbol decision for each sub-channel of the sub-channels except the strongest sub-channel, the first improved symbol decision generated based on the first modified signal vector using a second method;
        subtract a second signal from the received signal vector to form a second modified signal vector, the second signal based on the generated first improved symbol decision for each sub-channel of the sub-channels except the strongest sub-channel; and
        generate an improved symbol decision for the strongest sub-channel based on the second modified signal vector.

2. The wireless system of claim 1 wherein N is less than or equal to the number of the plurality of transmit antennas.

3. The wireless system of claim 1 wherein the number of the plurality of transmit antennas equals the number of the plurality of antennas.

4. The wireless system of claim 1 wherein the first method comprises:
    (a) performing a QR decomposition of a channel matrix of the sub-channels based on H=QG, where H is the channel matrix, Q is a unitary matrix, and G is an upper triangular matrix;
    (b) multiplying the received signal vector by a Hermitian transpose of the unitary matrix to define a transformed signal vector;
    (c) generating a first symbol decision for a first sub-channel of the sub-channels based on G and the transformed signal vector;
    (d) defining a first signal portion based on the generated first symbol decision;
    (e) subtracting the first signal portion from the transformed signal vector to form a third modified signal vector;
    (f) generating a second symbol decision for another sub-channel of the sub-channels based on the third modified signal vector; and
    (g) repeating (e)–(f) with each remaining sub-channel of the sub-channels, wherein the first signal portion is further based on the generated second symbol decision.

5. The wireless system of claim 1 wherein the second method comprises:
    (a) performing a QR decomposition of a channel matrix of the sub-channels excluding the strongest sub-channel, the QR decomposition based on H=QG, where H is the channel matrix, Q is a unitary matrix, and G is an upper triangular matrix;
    (b) multiplying the first modified signal vector by a Hermitian transpose of the unitary matrix to define a transformed signal vector;
    (c) generating a first symbol decision for a first sub-channel of the sub-channels excluding the strongest sub-channel based on G and the transformed signal vector;
    (d) defining a first signal portion based on the generated first symbol decision;
    (e) subtracting the first signal portion from the transformed signal vector to form a third modified signal vector;
    (f) generating a second symbol decision for another sub-channel of the sub-channels excluding the strongest sub-channel based on the third modified signal vector; and
    (g) repeating (e)–(f) with each remaining sub-channel of the sub-channels excluding the strongest sub-channel, wherein the first signal portion is further based on the generated second symbol decision.

6. A processor for use in a wireless system, the processor configured to:
    generate a plurality of symbol decisions $\hat{s}_n$; $1 \leq n \leq N$ from the received signal vector using a first method, where N is a number of sub-channels;
    subtract a first signal from the received signal vector to form a first modified signal vector, the first signal defined based on a symbol decision generated for a strongest sub-channel of the sub-channels;
    generate a first improved symbol decision for each sub-channel of the sub-channels except the strongest sub-channel, the first improved symbol decision generated based on the first modified signal vector using a second method;
    subtract a second signal from the received signal vector to form a second modified signal vector, the second signal based on the generated first improved symbol decision for each sub-channel of the sub-channels except the strongest sub-channel; and
    generate an improved symbol decision for the strongest sub-channel based on the second modified signal vector.

7. The processor of claim 6 wherein the first method comprises:
    (a) performing a QR decomposition of a channel matrix of the sub-channels based on H=QG, where H is the channel matrix, Q is a unitary matrix, and G is an upper triangular matrix;
    (b) multiplying the received signal vector by a Hermitian transpose of the unitary matrix to define a transformed signal vector;

(c) generating a first symbol decision for a first sub-channel of the sub-channels based on G and the transformed signal vector;

(d) defining a first signal portion based on the generated first symbol decision;

(e) subtracting the first signal portion from the transformed signal vector to form a third modified signal vector;

(f) generating a second symbol decision for another sub-channel of the sub-channels based on the third modified signal vector; and (g) repeating (e)–(f) with each remaining sub-channel of the sub-channels, wherein the first signal portion is further based on the generated second symbol decision.

8. The processor of claim 6 wherein the second method comprises:

(a) performing a QR decomposition of a channel matrix of the sub-channels excluding the strongest sub-channel, the QR decomposition based on H=QG, where H is the channel matrix, Q is a unitary matrix, and G is an upper triangular matrix;

(b) multiplying the first modified signal vector by a Hermitian transpose of the unitary matrix to define a transformed signal vector;

(c) generating a first symbol decision for a first sub-channel of the sub-channels excluding the strongest sub-channel based on G and the transformed signal vector;

(d) defining a first signal portion based on the generated first symbol decision;

(e) subtracting the first signal portion from the transformed signal vector to form a third modified signal vector;

(f) generating a second symbol decision for another sub-channel of the sub-channels excluding the strongest sub-channel based on the third modified signal vector; and (g) repeating (e)–(f) with each remaining sub-channel of the sub-channels excluding the strongest sub-channel, wherein the first signal portion is further based on the generated second symbol decision.

9. A method improving symbol decisions in a wireless system, the method comprising generating a plurality of symbol decisions $\hat{s}_n$; $1 \leq n \leq N$ from a received signal vector using a first method, where N is a number of sub-channels;

subtracting a first signal from the received signal vector to form a first modified signal vector, the first signal defined based on a symbol decision generated for a strongest sub-channel of the sub-channels;

generating a first improved symbol decision for each sub-channel of the sub-channels except the strongest sub-channel, the first improved symbol decision generated based on the first modified signal vector using a second method;

subtracting a second signal from the received signal vector to form a second modified signal vector, the second signal based on the generated first improved symbol decision for each sub-channel of the sub-channels except the strongest sub-channel; and generating an improved symbol decision for the strongest sub-channel based on the second modified signal vector.

10. The method of claim 9 wherein the first method comprises:

(a) performing a QR decomposition of a channel matrix of the sub-channels based on H=QG, where H is the channel matrix, Q is a unitary matrix, and G is an upper triangular matrix;

(b) multiplying the received signal vector by a Hermitian transpose of the unitary matrix to define a transformed signal vector;

(c) generating a first symbol decision for a first sub-channel of the sub-channels based on G and the transformed signal vector;

(d) defining a first signal portion based on the generated third symbol decision;

(e) subtracting the first signal portion from the transformed signal vector to form a first modified signal vector;

(f) generating a second symbol decision for another sub-channel of the sub-channels based on the third modified signal vector; and (g) repeating (e)–(f) with each remaining sub-channel of the sub-channels, wherein the first signal portion is further based on the generated second symbol decision.

11. The method of claim 10 wherein the first sub-channel is sub-channel N.

12. The method of claim 9 wherein the second method comprises:

(a) performing a QR decomposition of a channel matrix of the sub-channels excluding the strongest sub-channel, the QR decomposition based on H=QG, where H is the channel matrix, Q is a unitary matrix, and G is an upper triangular matrix;

(b) multiplying the first modified signal vector by a Hermitian transpose of the unitary matrix to define a transformed signal vector;

(c) generating a first symbol decision for a first sub-channel of the sub-channels excluding the strongest sub-channel based on G and the transformed signal vector;

(d) defining a first signal portion based on the generated first symbol decision;

(e) subtracting the first signal portion from the transformed signal vector to form a third modified signal vector;

(f) generating a second symbol decision for another sub-channel of the sub-channels excluding the strongest sub-channel based on the third modified signal vector; and (g) repeating (e)–(f) with each remaining sub-channel of the sub-channels excluding the strongest sub-channel, wherein the first signal portion is further based on the generated second symbol decision.

13. The method of claim 9 wherein the strongest sub-channel has a highest diversity order of the sub-channels.

14. The method of claim 9 wherein the strongest sub-channel has a highest signal-to-noise ratio of the sub-channels.

15. The method of claim 9 wherein a symbol decision of the plurality of symbol decisions represents a bit.

16. The method of claim 15 wherein the bit is coded.

17. A wireless system comprising:

a plurality of transmit antennas, the plurality of transmit antennas configured to transmit a signal vector;

a receiver including a plurality of antennas, the receiver configured to receive the signal vector; and a processor operably coupled to the receiver to receive the signal vector, the processor configured to (a) generate a plurality of symbol decisions $\hat{s}_n$; $1 \leq n \leq N$ using a first method, where N is a number of sub-channels;

(b) define a loopback set, wherein the loopback set includes a strongest symbol decision $\hat{s}_N$;

(c) repeat (d)–(k) for a predetermined number of iterations, wherein the predetermined number of iterations is greater than or equal to one;

(d) subtract a first signal from the received signal vector to form a first modified signal vector, the first signal defined based on the defined loopback set;

(e) generate a first improved symbol decision for each sub-channel of the N sub-channels not included in the loopback set, the first improved symbol decision generated based on the first modified signal vector using a second method;

(f) subtract a second signal from the received signal vector to form a second modified signal vector, the second signal based on the generated first improved symbol decision for each sub-channel not included in the loopback set;

(g) repeat (h)–(i) with each sub-channel of the defined loopback set as a current sub-channel;

(h) subtract a third signal from the second modified signal vector to form a third modified signal vector, the third signal based on the defined loopback set excluding the current sub-channel;

(i) generate an improved symbol decision $\hat{s}'$ for the current sub-channel, the improved symbol decision generated based on the third modified signal vector;

(j) if the predetermined number of iterations is greater than one, update the loopback set with the generated improved symbol decision $\hat{s}'$ for each sub-channel of the loopback set; and (k) if the predetermined number of iterations is greater than one, update the loopback set to include the generated first improved symbol decision of a next sub-channel, wherein the next sub-channel is selected from the sub-channels for which a symbol decision is not included in the loopback set.

18. The wireless system of claim 17 wherein N is less than or equal to the number of the plurality of transmit antennas.

19. The wireless system of claim 17 wherein the number of the plurality of transmit antennas equals the number of the plurality of antennas.

20. The wireless system of claim 17 wherein the first method comprises:

(l) performing a QR decomposition of a channel matrix of the sub-channels based on H=QG, where H is the channel matrix, Q is a unitary matrix, and G is an upper triangular matrix;

(m) multiplying the received signal vector by a Hermitian transpose of the unitary matrix to define a transformed signal vector;

(n) generating a first symbol decision for a first sub-channel of the sub-channels based on G and the transformed signal vector;

(o) defining a first signal portion based on the generated first symbol decision;

(p) subtracting the first signal portion from the transformed signal vector to form a fourth modified signal vector;

(q) generating a second symbol decision for another sub-channel of the sub-channels based on the fourth modified signal vector; and (r) repeating (p)–(q) with each remaining sub-channel of the sub-channels, wherein the first signal portion is further based on the generated second symbol decision.

21. The wireless system of claim 17 wherein the second method comprises:

(l) performing a QR decomposition of a channel matrix of the sub-channels not included in the loopback set, the QR decomposition based on H=QG, where H is the channel matrix, Q is a unitary matrix, and G is an upper triangular matrix;

(m) multiplying the first modified signal vector by a Hermitian transpose of the unitary matrix to define a transformed signal vector;

(n) generating a first symbol decision for a first sub-channel of the sub-channels not included in the loopback set based on G and the transformed signal vector;

(o) defining a first signal portion based on the generated first symbol decision;

(p) subtracting the first signal portion from the transformed signal vector to form a fourth modified signal vector;

(q) generating a second symbol decision for another sub-channel of the sub-channels not included in the loopback set based on the fourth modified signal vector; and (r) repeating (p)–(q) with each remaining sub-channel of the sub-channels not included in the loopback set, wherein the first signal portion is further based on the generated second symbol decision.

22. A processor for use in a wireless system, the processor configured to:

(a) generate a plurality of symbol decisions $\hat{s}_n$; $1 \leq n \leq N$ using a first method, where N is a number of sub-channels;

(b) define a loopback set, wherein the loopback set includes a strongest symbol decision $\hat{s}_N$;

(c) repeat (d)–(k) for a predetermined number of iterations, wherein the predetermined number of iterations is greater than or equal to one;

(d) subtract a first signal from the received signal vector to form a first modified signal vector, the first signal defined based on the defined loopback set;

(e) generate a first improved symbol decision for each sub-channel of the N sub-channels not included in the loopback set, the first improved symbol decision generated based on the first modified signal vector using a second method;

(f) subtract a second signal from the received signal vector to form a second modified signal vector, the second signal based on the generated first improved symbol decision for each sub-channel not included in the loopback set;

(g) repeat (h)–(i) with each sub-channel of the defined loopback set as a current sub-channel;

(h) subtract a third signal from the second modified signal vector to form a third modified signal vector, the third signal based on the defined loopback set excluding the current sub-channel;

(i) generate an improved symbol decision $\hat{s}'$ for the current sub-channel, the improved symbol decision generated based on the third modified signal vector;

(j) if the predetermined number of iterations is greater than one, update the loopback set with the generated improved symbol decision $\hat{s}'$ for each sub-channel of the loopback set; and (k) if the predetermined number of iterations is greater than one, update the loopback set to include the generated first improved symbol decision of a next sub-channel, wherein the next sub-channel is selected from the sub-channels for which a symbol decision is not included in the loopback set.

23. The processor of claim 22 wherein the first method comprises:
   (l) performing a QR decomposition of a channel matrix of the sub-channels based on H=QG, where H is the channel matrix, Q is a unitary matrix, and G is an upper triangular matrix;
   (m) multiplying the received signal vector by a Hermitian transpose of the unitary matrix to define a transformed signal vector;
   (n) generating a first symbol decision for a first sub-channel of the sub-channels based on G and the transformed signal vector;
   (o) defining a first signal portion based on the generated first symbol decision;
   (p) subtracting the first signal portion from the transformed signal vector to form a fourth modified signal vector;
   (q) generating a second symbol decision for another sub-channel of the sub-channels based on the fourth modified signal vector; and
   (r) repeating (p)–(q) with each remaining sub-channel of the sub-channels, wherein the first signal portion is further based on the generated second symbol decision.

24. The processor of claim 22 wherein the second method comprises:
   (l) performing a QR decomposition of a channel matrix of the sub-channels not included in the loopback set, the QR decomposition based on H=QG, where H is the channel matrix, Q is a unitary matrix, and G is an upper triangular matrix;
   (m) multiplying the first modified signal vector by a Hermitian transpose of the unitary matrix to define a transformed signal vector;
   (n) generating a first symbol decision for a first sub-channel of the sub-channels not included in the loopback set based on G and the transformed signal vector;
   (o) defining a first signal portion based on the generated first symbol decision;
   (p) subtracting the first signal portion from the transformed signal vector to form a fourth modified signal vector;
   (q) generating a second symbol decision for another sub-channel of the sub-channels not included in the loopback set based on the fourth modified signal vector; and
   (r) repeating (p)–(q) with each remaining sub-channel of the sub-channels not included in the loopback set, wherein the first signal portion is further based on the generated second symbol decision.

25. A method improving symbol decisions in a wireless system, the method comprising:
   (a) generate a plurality of symbol decisions $\hat{s}_n$; $1 \leq n \leq N$ using a first method, where N is a number of sub-channels;
   (b) define a loopback set, wherein the loopback set includes a strongest symbol decision $\hat{s}_N$;
   (c) repeat (d)–(k) for a predetermined number of iterations, wherein the predetermined number of iterations is greater than or equal to one;
   (d) subtract a first signal from the received signal vector to form a first modified signal vector, the first signal defined based on the defined loopback set;
   (e) generate a first improved symbol decision for each sub-channel of the N sub-channels not included in the loopback set, the first improved symbol decision generated based on the first modified signal vector using a second method;
   (f) subtract a second signal from the received signal vector to form a second modified signal vector, the second signal based on the generated first improved symbol decision for each sub-channel not included in the loopback set;
   (g) repeat (h)–(i) with each sub-channel of the defined loopback set as a current sub-channel;
   (h) subtract a third signal from the second modified signal vector to form a third modified signal vector, the third signal based on the defined loopback set excluding the current sub-channel;
   (i) generate an improved symbol decision $\hat{s}'$ for the current sub-channel, the improved symbol decision generated based on the third modified signal vector;
   (j) if the predetermined number of iterations is greater than one, update the loopback set with the generated improved symbol decision $\hat{s}'$ for each sub-channel of the loopback set; and
   (k) if the predetermined number of iterations is greater than one, update the loopback set to include the generated first improved symbol decision of a next sub-channel, wherein the next sub-channel is selected from the sub-channels for which a symbol decision is not included in the loopback set.

26. The method of claim 25 wherein the first method comprises:
   (l) performing a QR decomposition of a channel matrix of the sub-channels based on H=QG, where H is the channel matrix, Q is a unitary matrix, and G is an upper triangular matrix;
   (m) multiplying the received signal vector by a Hermitian transpose of the unitary matrix to define a transformed signal vector;
   (n) generating a first symbol decision for a first sub-channel of the sub-channels based on G and the transformed signal vector;
   (o) defining a first signal portion based on the generated first symbol decision;
   (p) subtracting the first signal portion from the transformed signal vector to form a fourth modified signal vector;
   (q) generating a second symbol decision for another sub-channel of the sub-channels based on the fourth modified signal vector; and
   (r) repeating (p)–(q) with each remaining sub-channel of the sub-channels, wherein the first signal portion is further based on the generated second symbol decision.

27. The method of claim 26 wherein the first sub-channel is sub-channel N.

28. The method of claim 25 wherein the second method comprises:
   (l) performing a QR decomposition of a channel matrix of the sub-channels not included in the loopback set, the QR decomposition based on H=QG, where H is the channel matrix, Q is a unitary matrix, and G is an upper triangular matrix;
   (m) multiplying the first modified signal vector by a Hermitian transpose of the unitary matrix to define a transformed signal vector;

(n) generating a first symbol decision for a first sub-channel of the sub-channels not included in the loopback set based on G and the transformed signal vector;

(o) defining a first signal portion based on the generated first symbol decision;

(p) subtracting the first signal portion from the transformed signal vector to form a fourth modified signal vector;

(q) generating a second symbol decision for another sub-channel of the sub-channels not included in the loopback set based on the fourth modified signal vector; and (r) repeating (p)–(q) with each remaining sub-channel of the sub-channels not included in the loopback set, wherein the first signal portion is further based on the generated second symbol decision.

29. The method of claim 25 wherein the strongest sub-channel has a highest diversity order of the sub-channels.

30. The method of claim 25 wherein the strongest sub-channel has a highest signal-to-noise ratio of the sub-channels.

31. The method of claim 25 wherein a symbol decision of the plurality of symbol decisions represents a bit.

32. The method of claim 31 wherein the bit is coded.

33. The method of claim 25 further comprising:

(l) defining a second loopback set, wherein the second loopback set includes a last improved symbol decision defined for a last iteration of (d)–(k); and (m) repeating (d)–(k) for a second predetermined number of iterations, wherein the second predetermined number of iterations is greater than or equal to one, and further wherein the defined loopback set is the second loopback set.

* * * * *

UNITED STATES PATENT AND TRADEMARK OFFICE
CERTIFICATE OF CORRECTION

PATENT NO.         : 7,218,906 B2                                      Page 1 of 1
APPLICATION NO. : 09/971071
DATED              : May 15, 2007
INVENTOR(S)        : Akbar Muhammad Sayeed and Ke Liu It is certified that error appears in the above-identified patent and that said Letters Patent is hereby corrected as shown below:

In the Claims

Column 5, Line 30 delete " $|g_{j,j}|^2 \sim \chi_{2(n-j+1)}^2, 1 \leq j \leq n$ " and insert -- $|g_{j,j}|^2 \sim \chi_{2(n-j+1)}^2, 1 \leq j \leq n$ --.

Column 6, Line 33 delete " $|g_{j,j}|^2 \sim \chi_{2(n-j+1)}^2$ " and insert -- $|g_{j,j}|^2 \sim \chi_{2(n-j+1)}^2$ --.

Column 7, Line 14 delete " $\chi_{2D}^2$ " and insert -- $\chi_{2D}^2$ --.

Column 8, Line 3 delete "$\rho^2$" after "interference power" and insert -- $\tilde{\sigma}^2$ --.

Column 10, Line 20 delete "k≤1" and insert -- k< 1 --.

Signed and Sealed this

Second Day of September, 2008

JON W. DUDAS
*Director of the United States Patent and Trademark Office*